US008483572B2

(12) United States Patent
Dynes et al.

(10) Patent No.: US 8,483,572 B2
(45) Date of Patent: Jul. 9, 2013

(54) QUANTUM COMMUNICATION SYSTEM AND METHOD

(75) Inventors: James Dynes, Cambridge (GB);
Zhiliang Yuan, Cambridge (GB);
Andrew W. Sharpe, Cambridge (GB);
Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 364 days.

(21) Appl. No.: 12/906,507

(22) Filed: Oct. 18, 2010

(65) Prior Publication Data
US 2011/0173696 A1    Jul. 14, 2011

(30) Foreign Application Priority Data

Jan. 8, 2010  (GB) .................................. 1000303.6

(51) Int. Cl.
*H04B 10/12*  (2006.01)
(52) U.S. Cl.
USPC ............................ 398/141; 398/158; 380/256
(58) Field of Classification Search
USPC .................... 398/141, 158; 380/256
See application file for complete search history.

(56) References Cited

U.S. PATENT DOCUMENTS
2007/0248362 A1   10/2007   Tanaka et al.

FOREIGN PATENT DOCUMENTS
GB   2 430 124 A    3/2007
GB   1 848 128 A1   10/2007

OTHER PUBLICATIONS

Patents Act 1977: Search Report under Section 17 issued Apr. 17, 2010, in Application GB1000303.6.
Jing-Bo Li, et al., "High Efficient Quantum Key Distribution by Random Using Classified Signal Coherent States", Chinese Physics Letters, vol. 23, No. 6, 2006, pp. 1375-1378.
Z. L. Yuan, et al., "Unconditionally secure one-way quantum key distribution using decoy pulses", Applied Physics Letters, 90, 011118, 2007, 5 pages.
Xiongfeng MA, et al., "Practical decoy state for quantum key distribution", Physical Review A, vol. 72, 012326, 2005, pp. 012326-1—012326-15.

(Continued)

*Primary Examiner* — Leslie Pascal
(74) *Attorney, Agent, or Firm* — Oblon, Spivak, McClelland, Maier & Neustadt, L.L.P.

(57) ABSTRACT

A quantum communication system, said system comprising: an emitter configured to send signal light pulses having a first intensity and decoy light pulses having a second intensity to a receiver, wherein information is encoded on said signal pulses; a controller configured to set the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system.

19 Claims, 7 Drawing Sheets

OTHER PUBLICATIONS

Daniel Gottesman, et al., "Security of quantum key distribution with imperfect devices", Quant. Inf Comput vol. 5, (arXiv: quant-ph/0212066v3), Sep. 3, 2004, 22 pages.

International Search Report and Written Opinion issued on Feb. 28, 2011 in corresponding International Application No. PCT/GB2010/002048 filed on Nov. 8, 2010.

J. F. Dynes et al., "Decoy Pulse Quantum Key Distribution for Practical Purposes", IET Optoelectronics, vol. 2, No. 5, 2008, XP 006031810, pp. 195-200.

A. R. Dixon et al., "Gigahertz Quantum Key Distribution with 1 Mbit/s Secure Key Rate Using Decoy Pulses", IEEE Conference on Optical Fiber Communication-Includes Post Deadline Papers, Mar. 22, 2009, XP 031467815, 3 Pages.

Won-Young Hwang, "Quantum Key Distribution with High Loss: Toward Global Secure Communication", Physical Review Letters, vol. 91, No. 5, Aug. 1, 2003, XP 002365746, pp. 057901-1-057901-4.

J. F. Dynes et al., "Unconditionally Secure One-Way Quantum Key Distribution Using Decoy Pulses", Conference on Lasers and Electro-Optics, May 1, 2007, XP 031203409 2 pages.

QUANTUM COMMUNICATION SYSTEM AND METHOD

CROSS-REFERENCE TO RELATED APPLICATION

This application is based upon and claims the benefit of priority from UK Patent Application No. 1000303.6 filed Jan. 8, 2010; the entire contents of which are incorporated herein by reference.

FIELD

Embodiments described herein generally relate to quantum communication systems and methods which support the so-called decoy state quantum key distribution methods.

BACKGROUND

There is often a need to communicate a message in secret over a channel which can potentially be intercepted by an eavesdropper. Traditionally, such a problem has been addressed by encrypting or enciphering the message using a secret key. Quantum communication provides a highly secure method for sending such a key. By encoding the key on a series of single photons, where each photon carries one bit of information encoded as a quantum state of the photon e.g. polarisation, phase or energy/time of a photon, an eavesdropper cannot intercept the key without at least partially changing the key. It is not possible to completely prevent an eavesdropper from obtaining the key, but providing that there is a single photon in each light pulse sent from the sender to the receiver, the eavesdropper will be detected.

However, many current quantum communication systems use an attenuated laser as a source of weak light pulses. Such pulses often contain more than one photon which introduces security issues since it is possible for an eavesdropper to split off one photon from a pulse without affecting the other photons in the pulse, a so-called photon number splitting attack PNS. To address the PNS attack, security can be increased by reducing the distance and/or the bit rate at which information can be transferred securely by quantum key distribution systems.

One such method is a decoy pulse protocol which has been proposed to improve security and transmission distance. This method sends signal pulses which carry the encoded information and decoy pulses of a second intensity. By determining the transmission efficiency of the signal and decoy pulses, it is possible to statistically spot the presence of a photon number splitting attack.

Considerable work has been performed on methods for determining a secure bit rate for such systems. The secure bit rate is the number of bits per unit time which may be transferred securely between an emitter(Alice) and a receiver (Bob). It will be lower than the actual rate of pulses sent from Alice.

However, in a real quantum communication system, parameters such as the intensity of the pulses which are sent will drift over time, thus reducing the security of the transmission.

BRIEF DESCRIPTION OF THE DRAWINGS

The present invention will now be described with reference to the following non-limiting embodiments in which:

FIG. 7a is a schematic of a quantum communication system in accordance with an embodiment; FIG. 7b shows the compliment output intensity against phase modulator bias voltage of the intensity modulating interferometer of FIG. 7a.

DETAILED DESCRIPTION

According to one embodiment a quantum communication system is provided, said system comprising: an emitter configured to send signal light pulses having a first intensity and decoy light pulses having a second intensity to a receiver, wherein information is encoded on said signal pulses; a controller configured to set the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system.

A quantum communication system in accordance with an embodiment of the invention may comprise a controller which is provided with values for the distribution of signal pulses and decoy pulses and the intensity of the signal pulse and does not need to perform any calculation.

In a further embodiment, the system comprises a processor which is configured to determine the variation in the secure bit rate with the signal pulse intensity and the decoy pulse intensity for different distributions of the signal pulses with decoy pulses;

determine the potential drift in the decoy pulse intensity during use of the system; calculate the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system; and output said distribution of signal pulses and decoy pulses and the intensity of the signal pulses to said controller.

There are many possible options for selecting the decoy pulse intensity at the start. One option is to provide the starting decoy pulse intensity in the centre of the range of the allowable drift for the calculated distribution of signal pulses and decoy pulses.

Systems in accordance with embodiments of the present invention may also work with protocols which have multiple decoy states. See for example the protocol Ma Phys. Rev A vol. 72 012326 (2005). In such a protocol, the free parameters are the fraction of signal pulses, the fraction of decoy 1 pulses and the fraction of decoy 2 pulses as well as the two decoy pulse intensities and the signal pulse intensities. It should be noted that the fraction of signal pulses, the fraction of decoy 1 pulses and the fraction of decoy 2 pulses represent 2 parameters since they must total 1. These parameters may be optimized in the same way as described when there is a single intensity decoy pulse.

The quantum communication system may further comprise a measuring unit configured to estimate the single photon gain and the single photon error rate for a determined quantum communication protocol. This allows the system to calculate the free parameters. These quantities may be derived from the mean transmittance of the decoy pulses and the signal photon error rate. The calculation of these parameters is well-known in the art. In summary, communication is sent using a known quantum communication protocol, this protocol can be any of the well-known protocols such as BB84, B92 etc. When the sender and the receiver compare their sent and received photons respectively of the decoy pulses, the mean transmittances and error rates of these decoy pulses can be estimated. Furthermore, the mean transmittance of the signal pulses can be measured as well as the error rate of the signal pulses.

The system may also be provided with a module which is configured to monitor the drift in the intensity of the decoy pulses. If the drift in decoy pulses is greater than that of the potential drift of the system, then an alarm sounds or communication is stopped as this indicates that the system is not secure.

The processor may be physically located within the emitter and therefore the emitter of the quantum communication system is self-contained and is capable of calculating the free parameters itself once it is installed. In an alternative embodiment, the processor is provided separate to the emitter and is capable of being closely coupled to a pulse controller within the emitter to provide the above control.

In one embodiment a quantum communication system is provided, said system comprising: an emitter configured to send signal light pulses having a first intensity and decoy light pulses having a second intensity to a receiver, wherein information is encoded on said signal pulses, and wherein the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system.

In a further embodiment, a Sagnac interferometer is used to perform intensity modulation on the signal and decoy pulses. The advantage of a Sagnac interferometer is that it is more resistant to drift than a Mach Zehnder interferometer.

In a further embodiment a quantum communication method is provided comprising:

sending signal light pulses having a first intensity and decoy light pulses having a second intensity from an emitter to a receiver, wherein information is encoded on said signal pulses; setting the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system.

Embodiments of the present invention can be implemented in hardware or on software or in a general purpose computer. Further, embodiments of the present invention can be implemented in a combination of hardware and software. Embodiments of the present invention can also be implemented by a single processing apparatus or a distributing network of processing apparatus.

Since embodiments of the present invention can be implemented by software, embodiments of the present invention encompasses a computer code provided to a general purpose computer or any suitable carrier medium. The carrier medium can comprise any storage medium such as a floppy disc, a CD ROM, a magnetic device or a programmable memory device or any transient medium such as a signal e.g. an electrical, optical or microwave signal.

In a further embodiment a method of controlling a quantum communication system is provided, said system comprising: an emitter configured to send signal light pulses having a first intensity and decoy light pulses having a second intensity to a receiver, wherein information is encoded on said signal pulses, the method comprising: determining the variation in the secure bit rate with the signal pulse intensity and the decoy pulse intensity for different distributions of the signal pulses with decoy pulses; determining the potential drift in the decoy pulse intensity during use of the system; and calculating the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system.

As mentioned above, the secure bit rate potential drift in the system is performed over a predetermined time frame. This time frame will be selected based on the intended use of the system.

Generally, the potential drift in the system will be measured by allowing the system to run over a particular time and continually measuring the drift in the decoy pulse intensity. However, for some uses, a worst case drift may be estimated based on previous use of the system or for use for typical systems. In one embodiment, it is always assumed that there will be a drift of at least 50% in the potential drift of the decoy pulse intensity.

How the decoy pulse intensity, the signal pulse intensity and the signal pulse fraction are set may be determined by a number of techniques. In an embodiment, the allowable drift in decoy pulse intensity will be calculated for one or more signal pulse fractions. The allowable drift is the drift in decoy pulse intensity at which the secure bit rate falls to 0 from its initial value. In other embodiments it may be the drift in decoy pulse intensity at which the secure bit rate falls to 5% or a larger percentage of its original value.

This allowable drift can be compared with the potential drift which has been measured for the system. Then, the signal pulse fraction which gives an allowable drift which is larger than the potential drift and which gives the highest secure bit rate may be selected.

Figure 1:
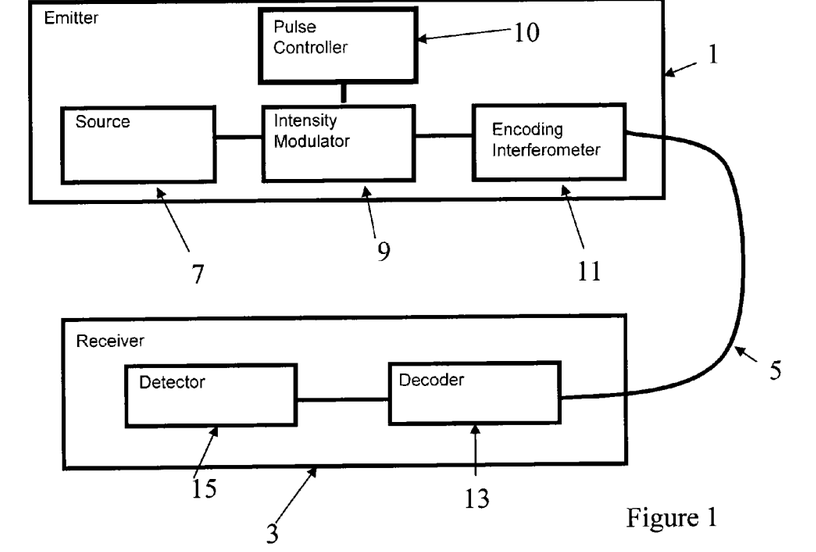
FIG. 1 is a schematic of a quantum communication system in accordance with an embodiment of the present invention.

FIG. 1 is a schematic diagram of a quantum communication system in accordance with an embodiment of the present invention. The system comprises an emitter 1 and a receiver 3 connected by a fibre optic cable 5.

Figure 2:
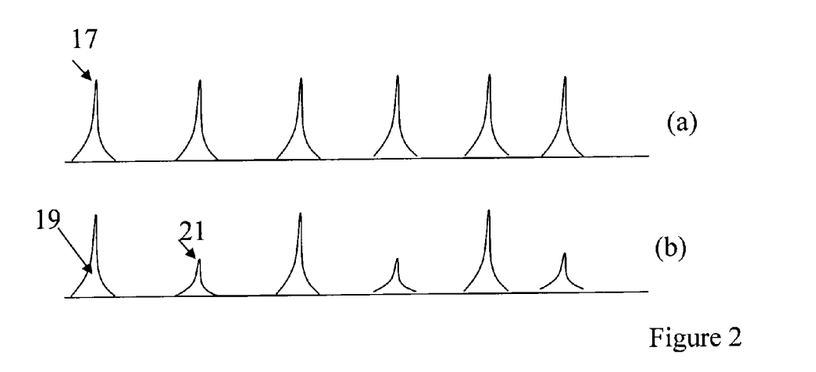
FIG. 2a is a schematic of the pulsed output of the source of FIG. 1
FIG. 2b is a schematic of the output of the intensity modulator of FIG. 1.

The emitter 1 comprises a source 7 of light pulses 17 (as shown in FIG. 2a). These pulses are then fed into intensity modulator 9. The output of intensity modulator 9 is shown in FIG. 2b. The pulses of FIG. 2a are split into pulses of two different intensities, those with a higher intensity 19 will be denoted as signal pulses and those with a lower intensity 21 will be decoy pulses. The signal pulses are usually stronger than the decoy pulses. Simulations, have shown that no secure bit rate is possible for signal pulses having a weaker intensity compared to the decoy pulses.

The intensity modulator 9 is controlled by pulse controller 10. Pulse controller 10 controls the intensity of the pulses output by intensity modulator 9 and the distribution of pulses of differing intensities. Pulse controller 10 may comprise a processor or may operate under the control of a processor.

The signal and decoy pulses are then fed into encoding interferometer 11. Here, the signal pulses will be encoded with a key which is to be sent to the receiver 3. In general, the decoy pulses are not encoded. However, such pulses may be encoded. In this embodiment, the pulses are encoded using phase. However, the pulses may also be encoded using polarisation, time or other quantum parameters.

The encoded signal pulses 19 and decoy pulses 21 then pass along fibre optic 5 to the receiving unit 3. Here they are decoded in decoder 13 and are detected by detector 15.

Figure 7:
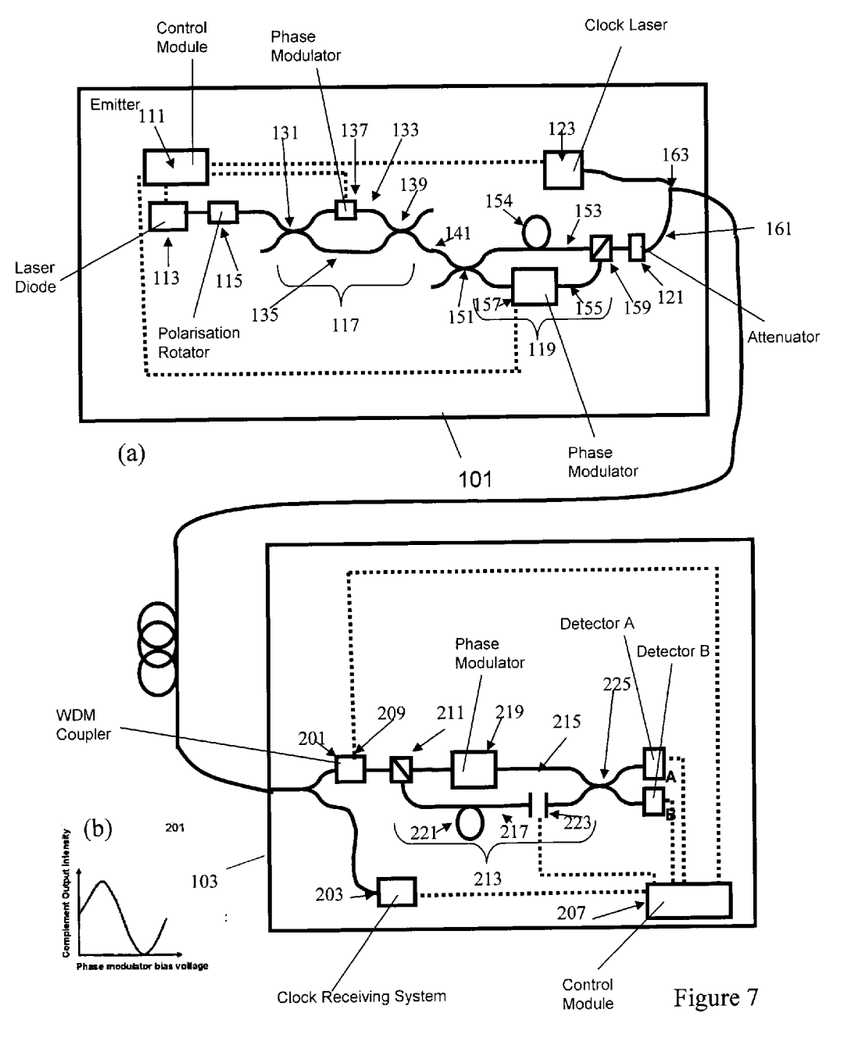

The above system is an over simplification. In practice, there will be timing references between the emitter 1 and receiver 3. Details of these extra features and details of arrangements for the pulse generator, intensity modulator 9, encoder 11, decoder 13 and detector 15 will be described with reference to FIGS. 7 and 8.

If a signal pulse 19 is sent from emitter 1 to receiver 3 along cable 5 and it is intercepted by an eavesdropper (Eve) the eavesdropper will show her presence since by measuring the photon she will have changed its state. If she further sends it onto the receiver 3, her presence will be shown by a statistically significant error in the readings taken over time.

However, the above discusses an ideal situation where every signal pulse which is sent from the emitter 1 to the receiver 3 contains just a single photon. In practice, this condition is rarely met. If some of the signal pulses contain more than one photon, then an eavesdropper can launch what is known as a photon number splitting attack (PNS). In a PNS attack, an eavesdropper splits off just a single photon from an intercepted pulse. This allows the eavesdropper to obtain information from this photon without affecting the information in the remainder of the pulse which passes to the receiver 3.

To counter the PNS attack, a pulse train is sent which has pulses of at least two different intensities (signal and decoy pulses). If photons from the pulses are being systematically lost due to the presence of an eavesdropper, then by comparing the received intensities of the two pulses (signal pulse and decoy pulses), the presence of an eavesdropper can be spotted. The intensity modulator 9 therefore allows the two or more pulse intensities to be produced in order to allow a statistical analysis to be performed to show the presence of an eavesdropper.

The intensity modulator 9 maybe located before or after the encoder.

The above system of sending pulses of two different intensities is known as decoy pulse quantum key distribution.

The situation is compounded by the fact that no system will be perfect (regardless of the presence or absence of an eavesdropper) and the ability of a source to output more than one photon in a pulse.

The secure bit rate for a given system is the number of bits which may be transferred securely between an emitter(Alice) and a receiver (Bob). It will be lower than the actual rate of pulses sent from Alice.

The secure bit rate is affected by:
(1) bit errors (bit flips): and
(2) the amount of knowledge of the exchanged (insecure) key an eavesdropper possesses (phase flips).

(1) can be corrected through a process known as error correction. Error correction involves correcting any bits that have changed during the key exchange. The objective of error correction is for Alice and Bob to end up with identical keys. Unfortunately error correction involves exchanging some classical information between Alice and Bob and an eavesdropper can learn something of this. The amount of error correction required depends on the overall error rate of the photon transmission and the overall transmission probability of the photon transmission. Once error correction is carried out, although Alice and Bob possess identical keys, an eavesdropper still could have knowledge of some or all of the key.

(2). To expunge this information, a procedure known as privacy amplification is applied (PA). PA hashes the key to produce a smaller key on which an eavesdropper has minimal information. As an eavesdropper can obtain information from multi-photon pulses, in the decoy method the size of the smaller key is determined only by the single photon error rate and single photon gain.

Thus, in simplest terms the secure bit rate can be written as:

Secure bit rate=$f$(Single photon error rate, Single Photon Gain)+$f$(Signal error rate, signal gain)

A particularly popular formula for calculating a lower bound on the secure bit rate was provided by Gottesman Lutkenhaus, Lo and Preskill (GLLP), ref: Quant. Inf Comput vol. 5 (2004) p. 324:

$$R = \frac{1}{2}Q_\mu\{-f(E_\mu)H(E_\mu)Q_\mu + (1+\Delta)\{1 - H[E_\mu/(1-\Delta)]\}\}$$

where $Q_\mu$ is the signal transmittance, $f(x)$ is the error correction module efficiency, $H(x)$ is the binary Shannon entropy function and $\Delta=\rho_{mult}/Q_\mu$ is the fraction of multiphoton pulses and $\rho_{mult}=\Sigma_{k=2}\rho_k$ is the probability that Alice's light pulse contains two or more photons and $E_\mu$ is the quantum bit error rate of the signal (QBER). The first term in the above equation for the secure bit rate reflects the contribution for error correction; the second term reflects the amount of privacy amplification required to expunge an eavesdropper's information from the key.

While the above formula is perfectly valid for imperfect devices, it does not yield particularly high key rates. The decoy method permits one to elevate the secure bit rate by monitoring the transmittances of the quantum channel by sending decoy states and thus detect PNS attacks. The GLLP formula has been modified by other workers (Ma of al.) to include the effect of sending decoy states, ref: Phys Rev A, vol. 72 012326 (2005). Here, the GLLP formula is re-arranged to:

$$R = \frac{1}{2}\{-f(E_\mu)H(E_\mu)Q_\mu + Q_1\{1 - H[e_1)]\}\}$$

where $Q_1$ is the single photon gain and $e_1$ is the single photon error rate. To incorporate one decoy state with signal states, the relevant formulae for single photon transmittance and single photon error rate are given below.

Figure 5A:
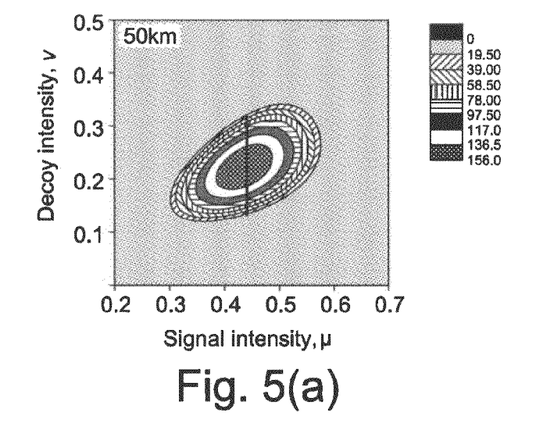
FIGS. 5a, b and c are intensity plots showing the secure key rate as a function of the signal intensity ($\mu$) and decoy intensity (u) for a fraction of signal pulses $N_\mu$ out of the total number of pulses, where $N_\mu$=optimal for maximum secure bit rate=0.56 in FIG. 5a, 0.1 in FIG. 5b and 0.75 in FIG. 5c.
Figure 5B:
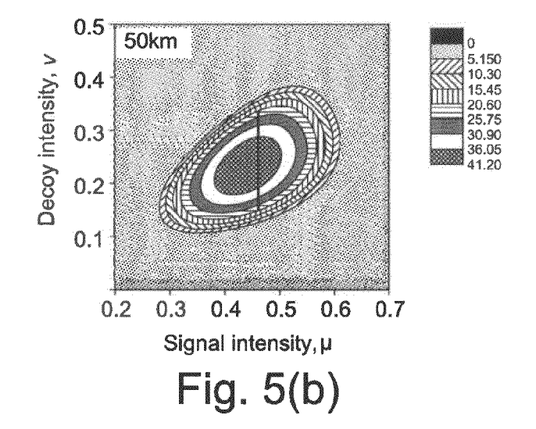
Figure 5C:
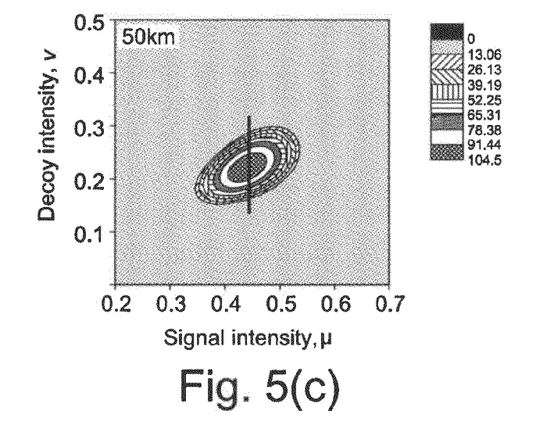

Single photon transmittance:

$$Q_1 = \frac{\mu^2 e^{-\mu}}{\mu\nu - \nu^2}\left(Q_\nu^L e^\nu - Q_\mu e^{-\mu}\frac{\nu^2}{\mu^2} - 2E_\mu Q_\mu \frac{\mu^2 - \nu^2}{\mu^2}\right)$$

where $\mu$ is the signal mean photon number, $\nu$ is the decoy mean photon number and $Q^L_{84}$ is the lower bound on the decoy transmittance. This can be estimated in a number of ways. It is assumed that the statistical distribution of the decoy intensity (N.B. this will not be exactly one number due to statistical deviation) is Gaussian, although a more precise analysis can be carried out by using a full Binomial analysis by those skilled in the art. Therefore $Q^L_\nu$ can be written as:

$$Q_\nu^L = Q_\nu\left(1 - \frac{\sigma}{\sqrt{N_\nu Q_\nu}}\right)$$

where $N_\nu$ is the number of decoy pulses used as decoy states and $\sigma$ is the number of standard deviations required. In the simulations of FIG. 5, very conservative bounds with $\sigma=10$ are used. This yields a confidence interval for statistical fluctuations of $1-1.5\times10^{-23}$.

Single photon error rate:

$$e_1 = \frac{E_\mu Q_\mu}{Q_1}$$

Inserting the single photon transmittance and single photon error rate into the re-written secure bit rate formula (GLLP), one obtains the secure bit rate using one decoy state with imperfect sources and detectors.

It can be seen that the above is dependent on the intensity of the signal pulses, the intensity of the decoy pulses and the ratio of the signal to decoy pulses. Generally, these three "free parameters" are set to give the highest secure bit rate possible for the system.

However, in a practical operating system, the intensities of both the signal and decoy pulses will drift over time. Therefore, any formula for the lower bound on the secure key rate R will vary over time.

As the decoy pulse intensity drifts during use of the system, the secure bit rate of the system also drifts. In many cases, a long term (over a number of days) drift of 30% of the decoy pulse intensity (which is common for many quantum communication systems) will result in a serious reduction in the secure bit rate and in some cases, the secure bit rate dropping to 0. This means that regardless of any privacy amplification or other techniques used by the sender and the receiver to reduce the key to a secure key, a secure key cannot be achieved.

Although the intensity of the signal pulses can drift, the dominant drift is due to the decoy pulses. Therefore, it is the variance of R with the drift of the decoy pulses which is of most importance.

The final secure key rate will be lower than without considering decoy uncertainty. If there is an uncertainty of $\Delta\nu$ due to the emitter then the receiver cannot distinguish between that and an attack by an eavesdropper. Therefore, the lowest key rate must be used for complete certainty.

Figure 3:
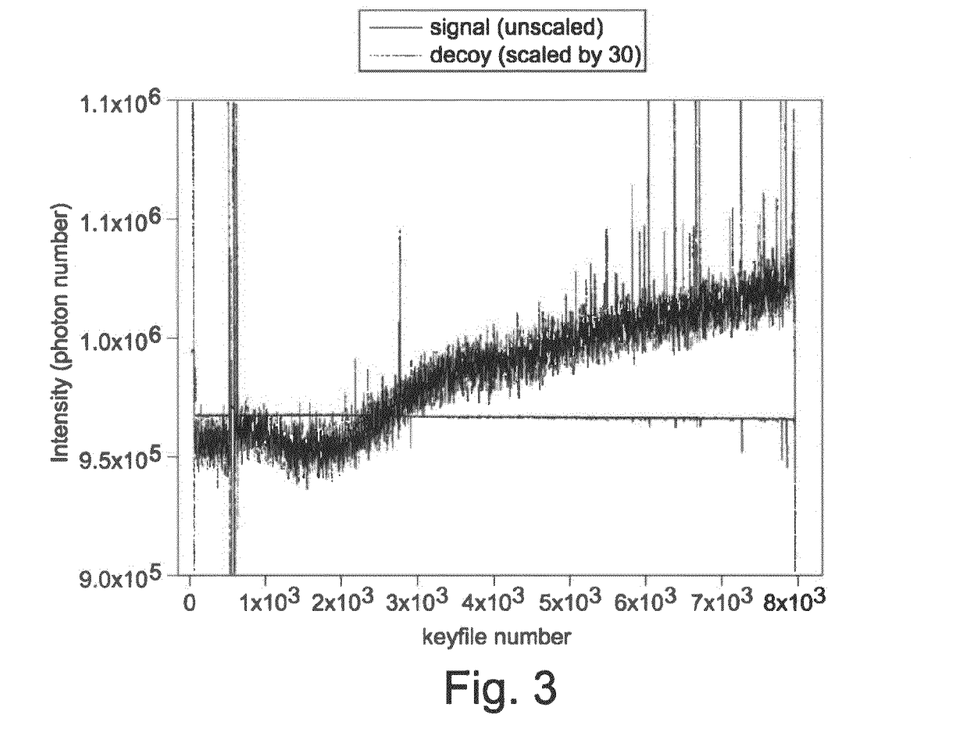
FIG. 3 is a plot of the intensity in units of number of photon detection events against time for the signal pulse and decoy pulse of FIG. 1.

FIG. 3 is plot of intensity for both the signal pulses and decoy pulses for a run of 30 hours. The x-axis is time but expressed in terms of key file number where each key file is approximately 15 seconds long. To aid comparison, the decoy intensity has been scaled by a factor of 30. The error in the decoy pulse intensity is the dominant variation and changes by about 5%.

The manner in which the secure key rate changes is computed numerically by an exploration of parameter space of the three free experimental parameters, signal intensity $\mu$, decoy intensity $\nu$ and the fraction of signal pulses=$N_\mu$. Also the fraction of decoy pulses is $N_\nu=1-N_\mu$. By varying all three parameters it is possible to find the optimum maximal secure key rate. The free parameters that give this optimum secure key rate may not be the ideal parameters for reducing the effect of decoy intensity drift on the final secure key rate.

Figure 4:
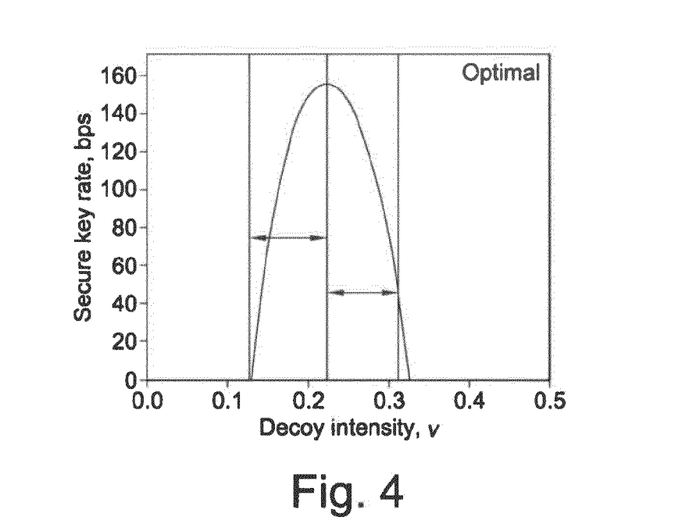
FIG. 4 is a plot of the secure quantum key bit rate in bits per second against decoy pulse intensity.

FIG. 4, shows as a function of decoy drift, the secure key rate (optimised for maximum secure key rate) that varies from zero to around a few hundred bps. The other experimental parameters used to generate FIG. 4 include (based on Z. L. Yuan et al. APL 90 011118, 2007): optical fibre distance 50 km featuring a loss characteristic of 0.187 dB/km laser, repetition rate 7.143 MHz, Bob's loss 0.565, a single photon detector efficiency of 10%, a combined detector dark count probability of $1.5\times10^{-4}$, total number of pulses sent by Alice, N=1 million, estimated Shannon error correction efficiency=1.1, and finally a detector error rate of 1%. The secure key rate falls to zero after about a 40% drift in decoy intensity, indicated by the arrow in FIG. 4. Based on the experimental data in FIG. 3, this drift could occur after several days of continuous QKD operation, rendering the QKD system useless with a zero secure bit rate. The signal mean photon number ~0.4

The free parameters of signal intensity $\mu$, decoy intensity $\nu$ and the fraction of signal pulses=$N_\mu$ are adjusted to reduce the dependence of the secure key rate on the drift of the decoy intensity. This is a three dimensional problem, the problem is visualised as three two-dimensional intensity plots, where the two axes of the intensity plots correspond to the signal and decoy intensities for a given $N_\mu$. The intensity of the grayscale plots are secure bit rates. The percentage changes of the secure bit rates as the decoy intensity drifts along the white bar are shown in the key.

In systems in accordance with embodiments of the present invention, the drift of the decoy pulse intensity is taken into account when selecting the optimum parameters. The parameters or (free) parameters are the signal pulse fraction, the signal pulse intensity and the decoy pulse intensity. For simplicity, the term signal pulse fraction will be used here and it is the fraction of signal pulses from the total of signal and decoy pulses. However, it is just a measure of the distribution of signal and decoy pulses and other measures of the distribution of signal and decoy pulses could also be used.

In systems in accordance with embodiments, two criteria need to be satisfied. The potential drift in the decoy pulse intensity over the use of the system is measured. This may be measured over a typical time scale for use for the system, a typical time scale between servicing, a typical time scale for sending a communication etc. Once this potential drift has been established, a maximum secure bit rate is only selected if the parameters which give this maximum secure bit rate do not cause the secure bit rate to drop to 0 or another defined minimum value if the decoy pulse intensity varies by the potential drift in the system. Therefore, such a system will never be in the position of the secure bit rate dropping to 0 or below another predefined operating limit.

Generally, a signal pulse fraction which is lower than that realised for the maximum secure bit rate will be used.

The secure bit rate is also a function of signal pulse intensity. Therefore, it is necessary to select both a signal pulse fraction and a signal pulse intensity which gives the highest average secure bit rate.

FIG. 5(a) is a two-dimensional intensity plot corresponding to the case in FIG. 4, the free parameters optimised to obtain maximum secure key rate. A white vertical bar is also shown, depicting the range of the secure key rate. For example, the range from the maximum secure key rate point ($\mu$=0.44, v=0.23) to zero secure key rate ($\mu$=0.44, v=0.13) is ~40% drift downwards in decoy intensity. If the signal fraction is reduced, i.e.: the decoy fraction increased, the range of the secure key rate can be widened at the expense of the maximum secure key rate.

FIG. 5(b) shows the range in secure key rate for $N_\mu$=0.1. The secure key rate now extends over a wider range than the previous situation. The white bar depicts the secure key rate range of the previous situation; one can clearly see the situation now is improved as the secure key rate can drift further without being zero. In fact the range is now 50% (for starting at ($\mu$=0.45, v=0.24) for reducing decoy intensity and ~55% for increasing decoy intensity.

FIG. 5(c) shows the effect if one chooses a large fraction of signal pulses $N_\mu$=0.75. Although the maximum key rate is comparable to the optimal situation (FIG. 5(a)) the range of secure key drift is much worse, with the secure key rate rapidly becoming zero after only a ~30% drift in decoy intensity. In this method, it is better to adjust the fraction of signal pulses to ~0.1 and integrate for longer to increase the size of the final secure key.

Returning to FIG. 1, the pulse controller 10 therefore controls the intensity modulator to satisfy the competing requirements of maintaining a high secure bit rate while still allowing a secure bit rate to be achieved across the operational range of the system over which the decoy pulse intensity may drift.

In an embodiment, the pulse controller 10 controls the intensity modulator under the control of a processor. The processor performs the steps of FIG. 6 to instruct the pulse controller to control the intensity of the pulses.

The processor which controls the pulse controller may be a processor provided as part of the emitter and may even form part of the pulse controller electronics. In an alternative embodiment, the processor is performed for steps shown in FIG. 6 offline and these values are fed to the pulse controller 10. Once the values of the signal pulse fraction, the starting decoy pulse intensity and the starting signal pulse intensity had been determined, these values are communicated to the receiver as these values are required in order for the receiver to properly decode the key.

Figure 6:
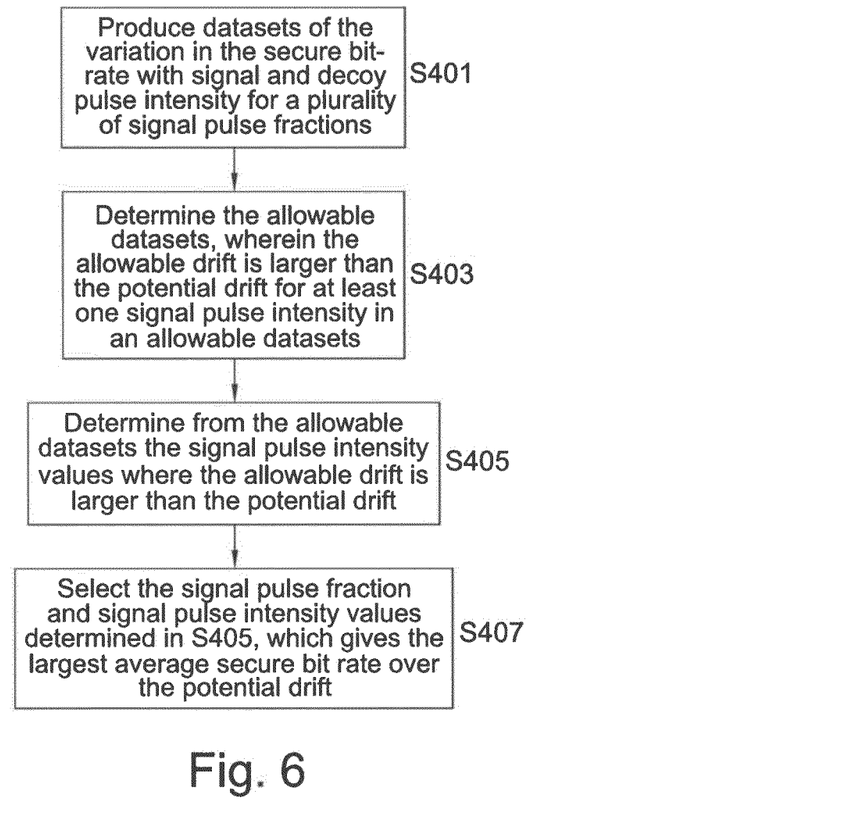
FIG. 6 is a flow diagram illustrating a method in accordance with an embodiment of the present invention.

In FIG. 6, step 401, data sets are produced showing the variation in the secure bit rate with both signal and decoy pulse intensity for a plurality of signal pulse fractions. It will be appreciated, that the signal pulse fraction could be expressed as the decoy pulse fraction (1—signal pulse fraction) and possibly ratio of signal pulses to decoy pulses.

The data sets may be of the type shown with references to FIGS. 5a to 5c. The plots may be produced using the equations decided above in order to derive the secure bit rate from the decoy pulse intensity and signal pulse intensity. However, variations on these equations are also possible, and the method is applicable to all possible estimations of the secure bit rate.

The procedure for obtaining a secure bit rate has been outlined in Z. L. Yuan et al APL 90 011118(2007). Generally, each key is generated in a length of time known as a "key generation session". The length of the session is determined by the required accuracy on the bounds on the secure key rate. If a short key generation session is used, then the statistical bounds on Bob's received decoy pulses mean photon number will be poorer than if the key session time is longer.

The procedure is:

(1) Alice runs the optimization program to select the mean photon number of the signal and decoy pulses and their associated fractions. In the initial set up procedure, Alice and Bob can evaluate the expected signal error rate offline by knowing the detector error probability ($e_{det}$), the detector efficiency (eta), the detector dark count probability (Y0), the attenuation loss of the channel, Bob's interferometer loss. The equation linking those parameters is given in the literature as:

$$E_u = \frac{1}{Q_u}\left\{\frac{1}{2}Y0 + e_{det}(1 - \exp(-eta*\alpha))\right\}$$

where $Q_u$ is the signal transmittance and a incorporates the channel loss characteristic as well as Bob's interferometer loss.

(2) Alice prepares signal pulses and decoy pulses encoding the signal pulses with bit information with the phase encoders) before sending them to Bob.

(3) Bob receives the pulses and stores them in memory.

(4) The key session time is determined by the bound given by the equation:

$$Q_v^L = Q_v\left(1 - \frac{\sigma}{\sqrt{N_v Q_v}}\right)$$

Usually, a key session time which results in Bob receiving 1 million photons is enough and was used in the simulations. See Z. L. Yuan et al APL 90 011118(2007) for more details.

(5) During the sifting procedure, Alice and Bob sort out which pulses were signal pulses and which pulses were decoy pulses. Then Bob can estimate the mean transmittance of the signal and decoy pulses with the statistical confidence given by the above equation. He also measures the error rate of the signal pulses (which involves by comparing a subset of his received bits to the same subset of Alice's bits which inevitably discloses some bits to an eavesdropper. This is a normal procedure in QKD).

(6) Knowing the signal error rate, the transmittance of the signal and decoy pulses, he can use the formulae given previously to estimate the single photon gain and the single photon error rate, and consequently evaluate the secure bit rate.

A data set may be produced for signal pulse fractions between 0.1 and 0.9 in steps of 0.1. Alternately, the data sets may be produced over a smaller range of signal pulse fractions. For example, if it was always known that signal pulse fractions of greater than 0.5 are of little use for the system. The intervals over which the data sets are produced do not need to be equal.

In step S401 of FIG. 6, these data sets are produced. They may be plotted as intensity plots or may be just stored and not displayed.

In step S403, the allowable datasets are determined. The allowable datasets are those datasets which have an allowable drift which is larger than the potential drift in the system for at least one signal pulse intensity in an allowable dataset. The potential drift in the system is measured by operating the system over a standard operating time frame. For example, this may be the time which it takes a message to generally be sent or may be of the time between servicing of the communication system. Over this time, the drift in decoy pulse intensity is measured. The allowable drift is the drift in decoy pulse intensity over which the secure bit rate drops from its maximum value to 0. In an alternative embodiment the allowable drift is measured from the maximum value of the secure bit rate to a predefined minimum value. Said predefined minimum value may be n % of the total secure bit rate where n for example is 5%, 10%, 20% etc. Alternately, it may be a fixed value, for example, the lowest useful value of the secure bit rate.

A plurality of datasets may then be determined as allowable datasets. In each of the allowable datasets, there will be at least one value of the intensity of the signal pulse which has an allowable drift which is larger than the potential drift. In some allowable datasets there will be more than one signal pulse intensity which satisfies the above requirement. The signal pulse intensities for the allowable data sets which satisfy the above requirement are then selected in S405.

It should be noted, that the allowable drift in decoy pulse intensity will be a function of the signal pulse fraction but it will also be a function of the signal pulse intensity. This can be seen from the plots of FIG. 5 where the white bar represents the drift in a decoy pulse intensity. It can be seen that as this bar is moved along the x-axis (i.e. for different values of signal pulse intensity) it extends over different regions of the secure bit rate. In an extreme example, in FIG. 5b, if the signal pulse intensity was 0.4, then only a minimal drift in the decoy pulse intensity would be allowed. Therefore, it is not simply necessary to choose the best signal pulse fraction, it is also necessary to choose the best signal pulse intensity which maintains the maximum average secure bit rate over the potential range of decoy pulse intensity drift. Therefore, it is possible that the maximum average secure bit rate will occur in a data set with a lower signal pulse fraction than the data set which contains the highest maximum secure bit rate.

For example, in prior art graph FIG. 5a, where the parameters are optimized to give the maximum secure bit rate, the signal intensity that gives the maximum secure bit is 0.44. However, when optimizing a signal pulse fraction to give maximum range for decoy drift, in FIG. 5b, the optimal signal intensity is approximately 0.46.

The signal pulse fraction and the signal pulse intensity values which have been determined in step S405 which give the largest average secure bit rate over the potential drift are then selected as being the starting parameters for the system.

The decoy pulse intensity will usually be set in the middle of the range of allowable drift. However, if drifting the system always takes place in one direction, for example decreasing decoy pulse intensity, then the decoy pulse intensity may be set such that as the decoy pulse intensity decreases, the secure bit rate increases then decreases.

In one embodiment, all possible datasets are considered. In another embodiment, pruning of the number of datasets to be considered is performed. For example, the dataset which contains the maximum secure bit rate is determined. Only data sets with signal pulse fractions which are equal to that in the data set with the maximum secure bit rate or lower signal pulse fractions will then be considered.

In a further embodiment, the data set will be selected using an iterative method where the allowable drift for the data set with the highest maximum secure bit rate will be first considered. Next, the allowable drift for various signal pulse intensities of the data set with the next lowest signal pulse fraction will be considered. This will be repeated for data sets with sequentially lower and lower signal pulse fractions. Once it is clear that the average secure bit rate is consistently decreasing in each of these data sets, it will not be necessary to continually measure the allowable drift for different signal pulse intensities for each of these data sets.

However, if drift in the system always takes place in one direction, (e.g. decreasing decoy pulse intensity), then the decoy pulse intensity may be set such that as the decoy pulse intensity decreases, the secure bit rate increases then decreases.

The flow chart of FIG. 6 can also be applied to protocol where the decoy pulses have two or more differing intensities. It is possible to calculate the secure bit rate for a protocol using two or more different decoy intensities using GLLP and Ma et al. Phys Rev A, vol. 72 012326 (2005). Therefore, the plots of FIG. 5 can be produced in an extra dimension (although this is not possible to easily envisage) to incorporate decoy pulse intensities varying in two axes and signal pulse intensities on a third axis.

In the same way as described above, it is then possible to determine the allowable data sets wherein the allowable drift is larger than the potential drift for at least one signal pulse intensity in an allowable data set. However, the allowable drift needs to be considered for both decoy pulse intensities (if there are two different decoy pulse intensities or three or more decoy pulse intensities dependent on the number of groups of decoy pulses).

The same calculation can then be formed to determine from the allowable data sets the signal pulse intensity values where the allowable drift is larger than the potential drift across both decoy pulse intensities. Then, the signal pulse fraction, fractions of both decoy pulses and signal pulse intensity values are selected which give the largest average secure bit rate over the potential drift in both decoy pulse intensities.

FIG. 7a shows a quantum communication system in accordance with an embodiment of the present invention.

The system comprises an emitter 101, and a receiver 103. The emitter 101 and the receiver 103 are connected by a fibre optic cable 105.

The emitter comprises a control module 111 which controls the sending system. The control module 111 comprises the function of the pulse controller described with reference to FIGS. 1 and 2.

Figure 7C:
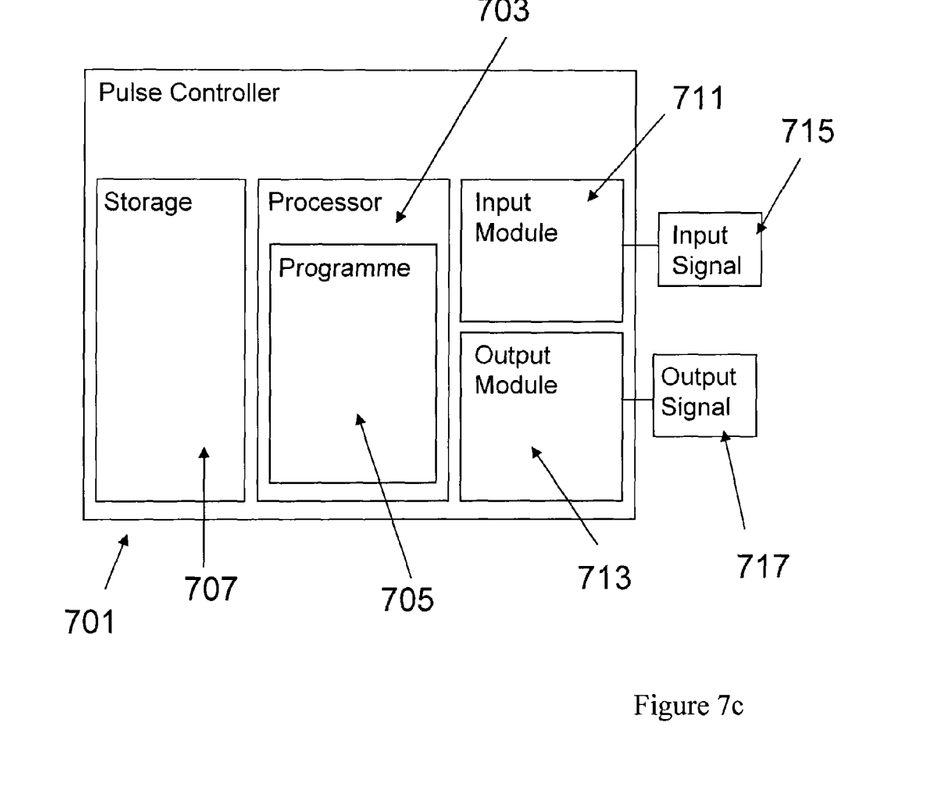
FIG. 7c is a schematic of a pulse controller.

FIG. 7c is a schematic of a possible implementation of the pulse controller which is comprised in the control module 111. Pulse controller 701 comprises a processor 703 which executes a programme 705. The pulse controller 701 further comprises storage 707. The storage 707 stores data which is used by programme 705 in order to determine the parameters required by the process of FIG. 6. The pulse controller 701 further comprises an input module 711 and an output module 713. The input module 711 receives inputs which allow it to perform the process outlined in FIG. 6. These may be pre-stored inputs or may be measured from the system directly and supplied to the pulse controller 701. The output module 713 outputs to control output signal 717 which in turn provides a control signal to control the intensity modulator 117. The output module 713 also provides this information in a form so that it may be passed to receiver 103 in order for the receiver to decode data.

The emitter also comprises a signal laser diode 113 the output of which is fed into a polarisation rotator 115. The polarisation rotator 115 ensures that all photons passing through the emitter have the same rotation at this point in the system. The photons are then fed into intensity modulator 117 which is configured to output pulses of a plurality of different intensities from the intensity modulator 117.

For simplicity, for the remainder of this description, the intensity modulator 117 will be configured to output pulses either of a first intensity or a second intensity. The output of the intensity modulator 117 is then directed into the encoding modulator 119 which is configured to encode information by means of relative phase modulation on photons passing through the interferometer 119.

An attenuator 121 is then provided on the output of modulator 119. The attenuator 121 is configured to further attenuate the pulses output from the modulator 119 to pulses which have on average less than 1 photon per pulse.

The control module 111 is also connected to bright clock laser 123. The signal from bright clock laser 123 and the output of attenuator 121 is combined and sent together down fibre 105 to the receiving unit 103.

The intensity modulator 117 in this embodiment is a Mach-Zender type interferometer which is balanced. Balanced, means that the length of the two arms of the interferometer are equal. The pulses from polariser 115 are fed into fibre coupler 131 which is at the input to intensity modulator 117. The fibre coupler is a 50:50 fibre coupler and will direct photons either along upper arm 133 or lower arm 135. In reality, each pulse follows both arms at the same time. A phase modulator 137 is provided in upper arm 133. Phase modulator 137 operates under the control of control module 111.

The intensity modulator 117 also comprises output fibre coupler 139 which is a 50:50 fibre coupler and is connected to both the upper arm 133 and the lower arm 135. One output of fibre coupler 139 is connected to the encoding modulator 119 and the other output forms the "$I_{complement}$" which is shown in FIG. 7b which may be used for monitoring of the intensity of the pulses which are output.

The control module 111 applies a bias to modulator 137 which varies the intensity at either arms of the output.

The pulses are then sent into encoding interferometer 119. The encoding interferometer in this embodiment is Mach-Zehnder interferometer the entrance of which is provided by a polarisation maintaining fibre coupler 151. Weak pulses are coupled into the same axis, usually the slow axis of the polarisation maintaining fibre, for both output arms of the polarisation maintaining fibre coupler 151.

The encoding interferometer 119 then comprises two arms, a long arm 153 and a short arm 155. Both these arms are coupled to the output of polarisation maintaining fibre coupler 151. The long arm 153 of the encoded interferometer 119 contains an optical fibre delay loop 154, while the short arm 155 contains fibre optic phase modulator 157.

The length difference of the two arms 153, 155 corresponds to an optical propagation delay of $T_{delay}$. Typically, the length of the delay loop 154 may be chosen to produce a delay of $T_{delay}$ which is approximately 5 nanoseconds. A photon travelling through the long arm 153 will lag that travelling through the short arm 155 by a time $T_{delay}$ at the exit of the interferometer 119.

The two arms 153 and 155 are combined together with a polarising beam combiner 159 into a single mode fibre 161. The fibre inputs of the polarising beam combiner 159 are aligned in such a way that only photons propagating along particular axes of the polarisation maintaining fibre output from the combiner 159. Typically, photons which propagate along the slow axis or fast axis are output by the combiner 159 into single mode fibre. The polarising beam combiner 159 has two input ports, an in-line input port and a 90° input port. One of the input ports is connected to the long arm 153 of the interferometer 119 and the other input port is connected to the short arm 155 of the interferometer 119. Only photons polarised along the slow axis of the in-line input port of the in-line input port are transmitted by the polarising beam combiner 159 and pass to the single mode fibre 161. Photons polarised along the fast axis are reflected and lost. At the 90° input port of the combiner 159, only photons polarised along the slow axis of the 90° input fibre are reflected by the beam combiner 159 and pass into the output port while those polarised along the fast axis will be transmitted out of the beam combiner 161 and lost. This means that the slow axis of one of the two input fibres is rotated by 90° relative to the output port. Alternately, the polarisation may be rotated using a polarisation rotator before one of the input ports of the polarising beam combiner 159. Thus, photon pulses which pass through the long arm 153 will have their polarisation rotated by 90° to those which pass through the short arm 155. The output pulses are then attenuated by attenuator 121. The attenuated pulses are then multiplexed with a bright laser clock at a different wavelength using a WDM coupler 163. The multiplexed signal is then transmitted to the receiving unit 103 along an optical fibre link 105.

The clock may also be delivered in other ways. For example, the sending unit may multiplex the signal pulses with a bright clock laser pulse at the same or different wavelengths which is delayed relative to the start of the clock cycle and which does not coincide with the signal pulses. Alternately, synchronisation may be achieved using a timing reference.

The optical fibre link 105 enters the sending unit 103 and first encounters WDM coupler 201. WDM coupler 201 splits off the clock signal to clock receiving system 203 which in turn provides a clock signal to receive a control module 207. The signal and decoy pulses which pass through WDM coupler 201 are first passed through polarisation rotator 209 which serves to correct any variations in the polarisation which might have occurred during travel along optical fibre 105. The pulses are then input into polarising beam splitter 211. Polarising beam splitter 211 marks the start of decoyed interferometer 213. Polarising beam splitter 211 is connected to upper arm 215 and lower arm 217 of interferometer 213. Upper arm 215 has a phase modulator 219 and lower arm 217 has a delay loop 221. The delay loop 221 is designed to introduce the same delay as delay loop 154 of the encoding interferometer 119.

In order to fine-tune the system to ensure that the difference between the paths of the encoding interferometer 119 is the same as the difference between the paths of the decoding interferometer 213, a fibre stretcher 223 is inserted in the lower arm 217 in order to adjust the path length.

The upper arm 215 and lower arm 217 are combined at 50:50 fibre combiner 225 which is non-polarising. One output of the fibre combiner 225 leads to detector A and the other output leads to detector B.

The polarising beam splitter 211 of the decoding interferometer and the polarising beam combiner 159 of the encoding interferometer ensure that if a pulse has travelled along the long arm 153 of the encoding interferometer then it will travel along the short arm of the decoding interferometer. Similarly, a pulse which travels along the short arm of the encoding interferometer will travel along the long arm of the decoding interferometer.

Such a model is a useful way of picturing the system. However, it is not strictly true to consider the system as a single pulse travelling down along one arm of one interferometer then through the other arm of the other interferometer. In reality, due to the quantum nature of light, a pulse will travel through both arms of an interferometer at the same time and it is only when a measurement is made that the path will be finalised.

By modulating the phase modulators 157 and 219, it is possible to obtain constructive or destructive interference at fibre combiner 225. The system can then be balanced such that destructive interference is recorded at detector A while constructive interference is registered at detector B.

Figure 8:
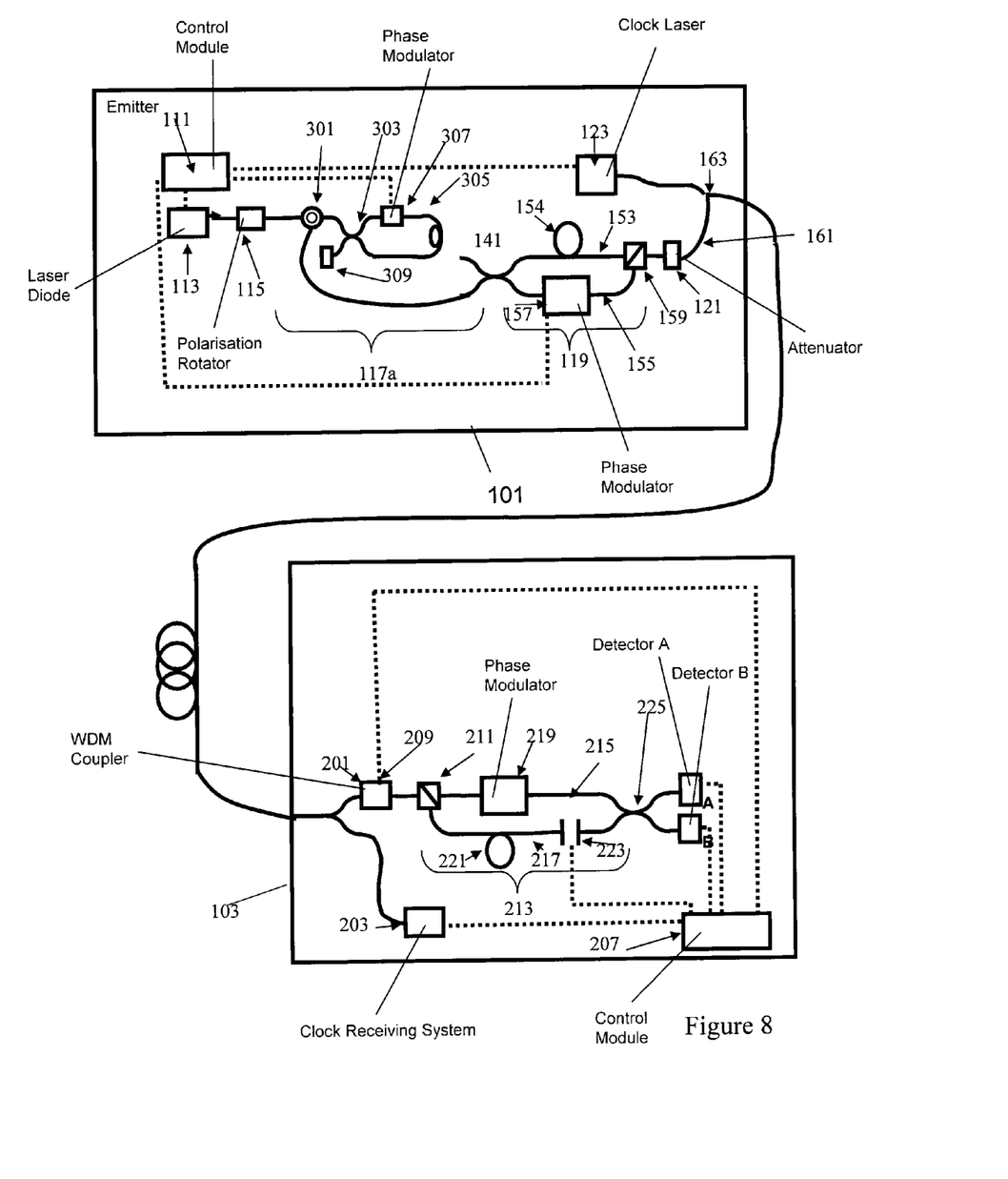
FIG. 8 is a schematic of a further apparatus in accordance with an embodiment of the present invention.

FIG. 8 is a schematic of a further quantum communication system in accordance with an embodiment of the present invention. The quantum communication system is similar to that described with reference to FIG. 7. Therefore, to avoid any unnecessary repetition, like reference numerals will be used to denote like features. However, the system of FIG. 7 and the system of FIG. 8 differ in the form of the intensity modulator 117 of FIG. 7 and 117a of FIG. 8.

The intensity modulator 117a of FIG. 8 is another interferometer based modulator system like that of FIG. 7. However, the intensity modulator 117a of FIG. 7 is based on a so-called Sagnac interferometer.

Therefore, the interferometer 117a comprises a polarisation maintaining circulator 301 at its input. Pulses entering the interferometer 117a once they have passed through the fibre circulator 301 are then passed into 50:50 fibre coupler 303 which passes pulses so that they travel down opposite directions right-hand and left-hand of the loop 305.

Fibre loop 305 comprises a phase modulator 307. Phase modulator 307 is on for a short amount of time when the left-hand pulse travels through but is off when the right-hand pulse reaches it. Therefore, the phase modulator only operates on one of the pulses. When both pulses are recombined back at fibre coupler 303, one output is directed towards fibre circulator 301 and out of the intensity modulator and the other to a compliment monitor 309.

In the same way as described with reference to the balanced Mach-Zender interferometer, the intensity of a pulse output from Sagnac interferometer 117a can be modulated by applying a suitable bias to phase modulator 307. Output pulses then exit fibre circulator 301 and are directed into encoding interferometer 119 in the same manner as described with reference to FIG. 7.

However, since both pulses travel around the same fibre loop, the drift in intensities between pulses of the first and second intensities is less than that experienced in a Mach Zender interferometer.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A quantum communication system, said system comprising:
    an emitter configured to send signal light pulses having a first intensity and decoy light pulses having a second intensity to a receiver, wherein information is encoded on said signal pulses;
    a controller configured to:
    receive a dataset, the dataset indicating a distribution of signal pulses and decoy pulses and an intensity of signal pulses, and
    set the distribution of signal pulses and decoy pulses and the intensity of the signal pulse according to the dataset, wherein the dataset is determined such that the maximum average secure bit rate is achieved over the range of potential drift in the decoy pulse intensity during use of the system, while maintaining a non-zero secure bit rate over the range of potential drift in the decoy pulse intensity during use of the system.

2. A quantum communication system according to claim 1, further comprising:
    a processor configured to:
    determine the variation in the secure bit rate with the signal pulse intensity and the decoy pulse intensity for different distributions of the signal pulses with decoy pulses;
    determine the potential drift in the decoy pulse intensity during use of the system;
    calculate the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system; and
    output said distribution of signal pulses and decoy pulses and the intensity of the signal pulses to said controller as the dataset.

3. A quantum communication system according to claim 2, wherein said processor is configured to select the starting decoy pulse intensity in the centre of the range of allowable drift for the calculated distribution of signal pulses and decoy pulses.

4. A quantum communication system according to claim 2, further comprising a module configured to monitor the drift in the intensity of the decoy pulses.

5. A quantum communication system according to claim 4, wherein the system is provided with an alarm if the drift in the intensity of the decoy pulses exceed the determined potential drift.

6. A quantum communication system according to claim 2, wherein said processor is physically located within said emitter.

7. A quantum communication system according to claim 1, comprising a Sagnac interferometer to control the intensity of the signal and decoy pulses.

8. A quantum communication system according to claim 1, wherein the emitter is configured to emit n groups of decoy pulses with n different intensities, where n is an integer of at least 2, and said distribution of signal pulses and decoy pulses is the distribution of signal pulses and said n groups of decoy pulses.

9. A quantum communication system, according to claim 1, further comprising a measuring unit configured to estimate the single photon gain and the single photon error rate for a determined quantum communication protocol.

10. A quantum communication system according to claim 9, wherein the single photon gain and the single photon error rate are estimated from the signal photon error rate and mean transmittance of decoy pulses.

11. A quantum communication system, said system comprising:
    an emitter configured to send signal light pulses having a first intensity and decoy light pulses having a second intensity to a receiver, wherein information is encoded on said signal pulses, and wherein the distribution of signal pulses and decoy pulses and the intensity of the signal pulse is set according to a dataset, the dataset indicating a distribution of signal pulses and decoy pulses and an intensity of signal pulses, the dataset being determined such that the maximum average secure bit rate is achieved over the range of potential drift in the decoy pulse intensity during use of the system, while maintaining a non-zero secure bit rate over the range of potential drift in the decoy pulse intensity during use of the system.

12. A quantum communication method comprising:
sending signal light pulses having a first intensity and decoy light pulses having a second intensity from an emitter to a receiver, wherein information is encoded on said signal pulses;
setting the distribution of signal pulses and decoy pulses and the intensity of the signal pulse according to a dataset, the dataset indicating a distribution of signal pulses and decoy pulses and an intensity of signal pulses, wherein the dataset is determined such that the maximum average secure bit rate is achieved over the range of potential drift in the decoy pulse intensity during use of the system, while maintaining a non-zero secure bit rate over the range of potential drift in the decoy pulse intensity during use of the system.

13. A quantum communication method according to claim 12, further comprising:
determining the variation in the secure bit rate with the signal pulse intensity and the decoy pulse intensity for different distributions of the signal pulses with decoy pulses;
determining the potential drift in the decoy pulse intensity during use of the system; and
calculating the dataset as the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system.

14. A quantum communication method according to claim 13, wherein the potential drift in the system is determined over a predetermined time frame.

15. A quantum communication method according to claim 13, wherein the potential drift in the system is estimated to be 50%.

16. A quantum communication method according to claim 13, wherein the dataset indicates a distribution of signal pulses and decoy pulses and the intensity of the signal pulse such that the maximum average secure bit rate is achieved over the range of potential drift in the decoy pulse intensity during use of the system, while maintaining a minimum secure bit rate over the range of potential drift in the decoy pulse intensity during use of the system, and said minimum secure bit rate is at least 5% of the maximum secure bit rate.

17. A quantum communication method according to claim 16, wherein setting the distribution of signal pulses and decoy pulses and the intensity of the signal pulse signal pulse fraction comprises:
determining the allowable drift in decoy pulse intensity for distributions of signal pulses and decoy pulses and signal pulse intensities, wherein the allowable drift is the drift in decoy pulse intensity at which the secure bit rate falls to zero;
comparing the allowable drift with the potential drift in the decoy pulse intensity of the decoy pulse during use of the system for said distributions of signal pulses and decoy pulses and signal pulse intensities;
and selecting the distribution of signal pulses and decoy pulses and the intensity of the signal pulse for the dataset such that the maximum average secure bit rate is achieved over the range of potential drift, while maintaining a non-zero secure bit rate over the range of potential drift.

18. A method of controlling a quantum communication system, said system comprising:
an emitter configured to send signal light pulses having a first intensity and decoy light pulses having a second intensity to a receiver, wherein information is encoded on said signal pulses,
the method comprising:
determining the variation in the secure bit rate with the signal pulse intensity and the decoy pulse intensity for different distributions of the signal pulses with decoy pulses;
determining the potential drift in the decoy pulse intensity during use of the system; and
calculating the distribution of signal pulses and decoy pulses and the intensity of the signal pulse such that the maximum average secure bit rate is achieved over the range of potential drift in the decoy pulse intensity during use of the system, while maintaining a non-zero secure bit rate over the range of potential drift in the decoy pulse intensity during use of the system.

19. A carrier medium carrying computer readable instructions for controlling the computer to carry out the method of claim 18.

* * * * *